No. 699,855. Patented May 13, 1902.
J. F. STECKENREITER.
ROTARY MEASURE.
(Application filed May 8, 1901.)
(No Model.)
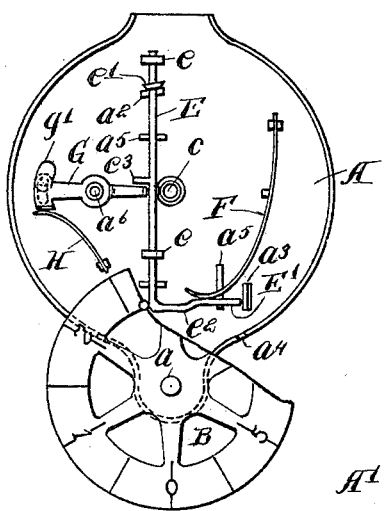
Fig. 2
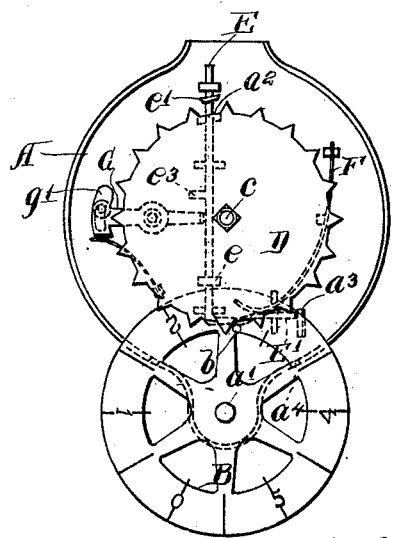
Fig. 3
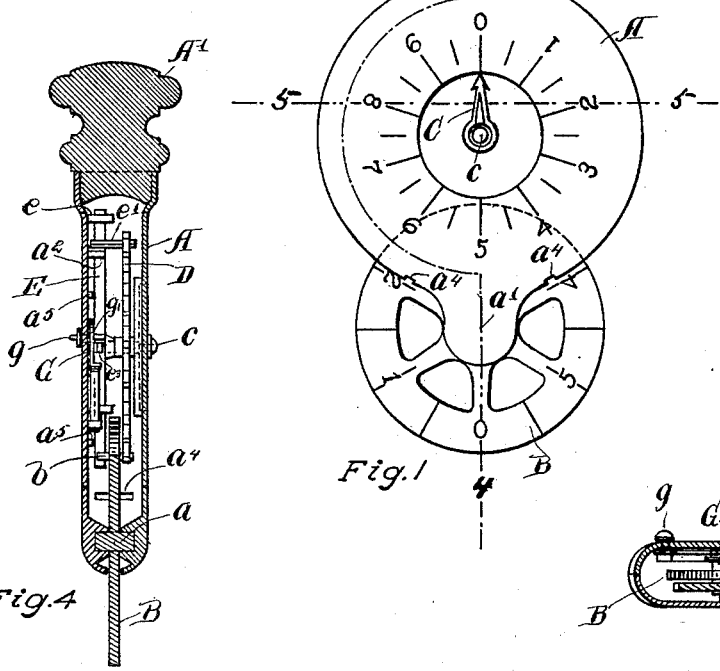
Fig. 1
Fig. 4
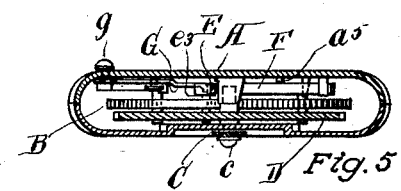
Fig. 5
Witnesses:
W. L. Hall
Carl S. Crawford
Inventor:
John F. Steckenreiter
by Poole & Brown
His Attorneys
THE NORRIS PETERS CO., PHOTO-LITHO., WASHINGTON, D. C.

UNITED STATES PATENT OFFICE.

JOHN F. STECKENREITER, OF CHICAGO, ILLINOIS.

ROTARY MEASURE.

SPECIFICATION forming part of Letters Patent No. 699,855, dated May 13, 1902.

Application filed May 8, 1901. Serial No. 59,220. (No model.)

*To all whom it may concern:*

Be it known that I, JOHN F. STECKENREITER, of Chicago, in the county of Cook and State of Illinois, have invented certain new and useful Improvements in Rotary Measuring Devices; and I do hereby declare that the following is a full, clear, and exact description thereof, reference being had to the accompanying drawings, and to the letters of reference marked thereon, which form a part of this specification.

This invention relates to an improved rotary measuring device which for many purposes can do the work of a straight rule or tape to better advantage than either of said devices, and is especially designed for measuring curved lines and surfaces, such as scrollwork or other bent or curved work as found in iron and bridge work, and inside or outside surfaces of cylindric or circular bodies or other measurements of similar surfaces and may be used also for checking curved lines on drawings to determine if they agree with calculations or for measuring the necessary curved lines on drawings and avoiding calculations altogether or for estimating purposes.

The object of the invention is to produce a device of this character which is simple in construction, positive in action, and accurate in regard to measurement and one which may, if desired, be conveniently used as a pocket instrument.

The device herein illustrated, in which my improvements are shown as embodied, consists of a suitable casing provided on its front face with a dial, a measuring-wheel mounted in such casing and connected with a pointer which coöperates with such dial, so as to move said pointer one step or point for each rotation of the measuring-wheel, whereby such pointer will record the number of rotations of the measuring-wheel. The measuring-wheel is also graduated, so that after a measurement has been made the number of feet or inches over which the wheel has traveled will be indicated by the pointer plus the number of inches of a partial rotation of the measuring-wheel which has not yet been recorded by the pointer.

The invention consists in the matters hereinafter set forth, and more particularly pointed out in the appended claims.

In the drawings, Figure 1 is a front elevation of a measuring device embodying my improvements. Fig. 2 is a similar view showing the front part of the casing and parts of the operative mechanism removed and the measuring-wheel partly broken away. Fig. 3 is a similar view showing the front part of the casing removed and the operative mechanism in place therein. Fig. 4 is a vertical section on the indirect line 4 4 of Fig. 1. Fig. 5 is a horizontal section on line 5 5 of Fig. 1.

As shown in said drawings, A designates a generally circular casing made of two separable parts joined at their edges in any suitable manner and shown as provided at its upper parts with a handle A'. Such casing contains the recording mechanism, and the front plate of the casing is graduated to form a dial, which is marked, as herein shown, to indicate feet and half-feet.

B designates a circular measuring-wheel, which is rotatively mounted on a short shaft $a$, attached to a projection $a'$ at the lower part of the casing. Said measuring-wheel end projects partially into such casing and, as herein shown, has a peripheral length of six inches, but may be of greater or less diameter and may be graduated to any required system of measurement.

C designates a rotary pointer which is mounted on a rotative shaft $c$, which has bearing in the walls of the casing. Said pointer desirably rotates in a depressed part of the front plate of the casing, so as not to project therefrom.

D designates a toothed wheel mounted rigidly on the shaft $c$ within the casing. The measuring-wheel B is provided adjacent to its periphery with an actuating-pin $b$, which passes through the wheel and projects from both sides thereof, as clearly shown in Fig. 4, and which is adapted to strike one of the teeth of the wheel D at each rotation of the measuring-wheel, so as to rotate or turn such wheel D of the shaft $c$ and pointer C one step or space on the dial for each rotation of the measuring-wheel B. The periphery of the casing A is provided with slots $a^4$, so located as to permit said pin to pass into and out of the casing upon the rotation of the measuring-wheel. Means are provided for locking said toothed wheel and the pointer connected therewith after the same has been actuated one step by the measuring-wheel and which locking means are released by a part on the measuring-wheel preparatory to actuating the pointer. Said means consist in this instance in the following devices.

E designates a vertically-reciprocating plunger sliding in bearing-lugs $e$, connected with the rear plate of the casing A. Said plunger is located between the toothed wheel D and the rear plate of the casing and is parallel with said wheel, and the measuring-wheel B projects into the casing between the toothed wheel and the plunger. Said plunger is provided with a detent $e'$, adapted to fall into one of the spaces between two adjacent teeth of the wheel D when said plunger is in its lowermost position.

$a^2$ designates a stop connected with the back plate of the casing, which engages the detent-tooth and limits the downward movement of the plunger. Said plunger is provided at its lower end with a laterally-extending arm E', which is provided between its ends with a downwardly-curved portion $e^2$, as shown in Fig. 2. The outer end of said arm abuts against a stop $a^3$ on the back plate of the casing. The plunger is held in its lowermost position by a spring F, which, as herein shown, has the form of a leaf-spring, attached at its upper end to a lug on the casing-wall and arranged to exert a downward pressure on said arm. In order to decrease the friction between the plunger E and arm E' in the casing, said plunger and arm engage narrow contact-strips $a^5$ on the back plate of the casing. The arm E' of said plunger is located at the lower edge of said toothed wheel, and the curved part $e^2$ of the arm is so located with respect to the teeth at the lower part of the wheel that said part of the arm is engaged by one end of the actuating-pin $b$ on the measuring-wheel B slightly before the other end of said pin engages one tooth of the wheel. The measuring-wheel B rotates in the direction indicated by the arrow in Fig. 1, and the pointer rotates in the direction indicated by the arrow on the casing in said Fig. 1. It will be seen, therefore, that when the measuring-wheel is rotated to bring the pin $b$ thereof into engagement with the curved part of the arm E' of the plunger said pin raises said arm and plunger against action of the spring and lifts the detent-tooth $e'$ above the upper tooth of said toothed wheel. The pin $b$ thereafter comes in contact with one of the lower teeth of said wheel D and rotates said wheel and the pointer one step. After said wheel has been rotated one step the pin passes off the curved part of the arm of the plunger and the spring F returns said plunger and the detent $e$ thereof to the lowermost position and locks the wheel D and the pointer from further rotation. The pin $b$, extending through the wheel B, constitutes, in effect, two projections, one on each side of the wheel, and said projections may be otherwise formed. This operation is continued as many times as it is required to completely rotate the wheel B for measuring the distance required. This construction insures that the pointer will be stopped on one of the graduated points on the dial and will not be accidentally displaced.

It is always desirable to start the pointer at zero in beginning a measurement. As said pointer may stop at any place on the dial at the end of the different measurements, it is desirable to provide means for readily turning said pointer back to zero before beginning the next measurement. Means are herein shown for this purpose, consisting of a lever G, which is pivoted between its ends to a stud $a^6$ on the back plate of the casing and is provided at its inner end with a bent portion which engages the under surface of a laterally-projecting pin or lug $e^3$ on the plunger E. The other end of said lever is provided with a finger-piece $g$, which projects through the slot of the rear casing-wall, by which the lever may be manipulated. Desirably said lever is provided inside the casing with an extension $g'$, projecting above and below the same and made sufficiently long to cover said slot in the different positions of the lever, so as to prevent ingress of dust through said slot. The lever is held in its normal position, with the inner end thereof slightly out of engagement with the lug or pin $e^3$ of the plunger, by means of a leaf-spring H, attached rigidly to the rear casing-plate and bearing against the lower end of the extension $g'$ at the outer end of said lever, said extension being bent outwardly to form a bearing for said spring. With this construction when it is desired to return the pointers to zero the outer end of the lever G is pressed downwardly, which raises the plunger E and the detent-tooth $e'$, carried thereby. When the parts are in this position, the toothed wheel is free to rotate in either direction, so that said pointer may be freely turned to zero. The measuring-wheel B should also be started at zero. The lower end of the plunger is so arranged with respect to the circular path of travel of the pin $b$ that when the direction of rotation of said wheel is reversed the pin strikes the lower end of said plunger on the side opposite to the arm E' and arrests the motion of the wheel. The arm which bears against the stop $a^3$ takes the stress exerted through the pin $b$ at this time and acts in the manner of a strut to prevent bending of the plunger E. The zero-point on the measuring-wheel B is so disposed as to occupy the lower part of the wheel when the pin $b$ is thus engaged with the plunger E, and in order to return said wheel to the zero-point it is only necessary to slide the wheel gently along the surface to be measured, so as to reverse the rotation of the wheel and bring the stop $b$ against the plunger.

The device shown is useful for measuring parts on engineers' and architects' drawings for the purpose of estimating lengths and quantities of material. For this purpose it may be desirable to make the peripheral length of the measuring-wheel but three inches instead of six inches, and the other parts of the device may in this case be so proportioned as to adapt the instrument to be carried in the vest-pocket. In taking off measurements from drawings it is not necessary to make a note of each item and thereafter foot the several items, as the totals of the accumulated measurements are recorded on the dial, and it is only necessary to take note of the several complete and partial rotations of the pointer.

While I have shown a practical form or embodiment of my improvements, I do not wish to be limited thereto except as may be made the subject of specific claims, as it is obvious that some of the details may be varied without departing from the spirit of my invention and that certain of the parts may be otherwise adapted for work.

I claim as my invention—

1. A measuring device comprising a frame or casing, a rotary, graduated measuring-wheel journaled in the casing and projecting therefrom for contact with the article to be measured, a dial on the casing, a pointer, eccentric to said measuring-wheel, coöperating with said dial and capable of a step-by-step movement, means for locking said pointer from movement in either direction after each step of its movement and means on the measuring-wheel for first effecting the release of said locking means and thereafter moving said pointer one step.

2. A measuring device comprising a frame or casing, a rotary, graduated measuring-wheel journaled in the casing and projecting therefrom for contact with the article to be measured, a dial on the casing, a pointer, eccentric to said measuring-wheel, coöperating with said dial and capable of a step-by-step movement, means for locking said pointer from movement in either direction after each step of its movement, means on the measuring-wheel for first effecting the release of said locking means and thereafter moving said pointer one step and means independent of the measuring-wheel for releasing said locking means to permit the pointer to be returned to zero.

3. A rotary measuring device comprising a frame or casing, a toothed wheel journaled therein, a dial on the casing, a pointer coöperating with the dial and rotating with said toothed wheel, a graduated measuring-wheel journaled in the casing eccentrically to said toothed wheel and projecting from the casing for contact with the article to be measured, means for locking the toothed wheel from rotation and means on the measuring-wheel for first releasing the locking means and thereafter turning the toothed wheel one step, said locking means locking the toothed wheel from rotation in either direction after each step of its movement.

4. A rotary measuring device comprising a frame or casing, a toothed wheel journaled therein, a dial on the casing, a pointer coöperating with the dial and rotating with said toothed wheel, a graduated measuring-wheel journaled in the casing eccentrically to said toothed wheel and projecting from the casing for contact with the article to be measured, means for locking the toothed wheel from rotation, means on the measuring-wheel for first releasing the locking means and thereafter turning the toothed wheel one step, said locking means locking the toothed wheel from rotation in either direction after each step of its movement, and means independent of the measuring-wheel for releasing said locking means and permitting the pointer to return to zero.

5. A measuring device comprising a frame or casing, a rotary, graduated measuring-wheel, journaled in said casing and projecting therefrom for contact with the article to be measured, a dial on the casing, a pointer coöperating with said dial and capable of a step-by-step movement, means for locking said pointer from movement in either direction after each step of its movement, means on the measuring-wheel for first releasing said locking means and thereafter moving said pointer one step, said measuring-wheel being free to return to zero, and means independent of the measuring-wheel for releasing the pointer-locking means to permit said pointer to be returned to zero.

6. A rotary measuring device, comprising a casing, a toothed wheel journaled therein, a dial on the casing, a pointer connected with the wheel and coöperating with the dial, a reciprocating plunger in the casing provided with a detent adapted to interlock with the teeth of said wheel, a rotary measuring-wheel journaled in the casing and projecting thereinto between said toothed wheel and plunger and adapted to engage said plunger to release the detent from said toothed wheel and thereafter turn said wheel.

7. A rotary measuring device, comprising a casing, a toothed wheel journaled therein, a dial on the casing, a pointer connected with the wheel and coöperating with the dial, a reciprocating plunger in the casing provided with a detent adapted to interlock with the teeth of said wheel, a rotary measuring-wheel journaled in the casing and projecting thereinto between said toothed wheel and plunger and adapted to engage said plunger to release the detent from said toothed wheel, and thereafter turn said wheel and means for restoring the locking means after said toothed wheel has been turned one step.

8. A rotary measuring device, comprising a casing, a toothed wheel journaled therein, a dial on the casing, a pointer connected with the wheel and coöperating with the dial, a reciprocating plunger in the casing provided with a detent adapted to interlock with the teeth of said wheel, a rotary measuring-wheel journaled in the casing and projecting thereinto between said toothed wheel and plunger, and projecting parts on said measuring-wheel adapted to engage said plunger to release the detent from said toothed wheel and thereafter turn said wheel one step, and a spring-pressed lever pivoted in the casing having an exposed finger-piece at one end and adapted to engage at its other end a projection on the plunger to release the detent thereof from the toothed wheel.

9. A rotary measuring device comprising a casing, a toothed wheel journaled therein, a dial on the casing, a pointer connected with the toothed wheel and coöperating with the dial, a reciprocating plunger in said casing at one side of the toothed wheel provided at its upper end with a detent adapted to engage the teeth of said toothed wheel and at its lower end with a laterally-directed arm, a rotary measuring-wheel journaled in the casing and projecting thereinto between the plunger and toothed wheel, and projecting parts on said measuring-wheel adapted to engage a projecting part on the arm to release the detent thereof from the teeth of the toothed wheel and to thereafter engage one of the teeth of said toothed wheel to rotate the latter one step.

10. A rotary measuring device, comprising a casing, a toothed wheel journaled therein, a dial on the casing, a pointer connected with the toothed wheel and coöperating with the dial, a reciprocating plunger in said casing at one side of the toothed wheel provided at one end with a detent adapted to engage the teeth of said toothed wheel, and at its other end with a laterally-directed arm, a rotary measuring-wheel journaled in the casing and projecting thereinto between the plunger and toothed wheel, and projecting parts on said measuring-wheel adapted to engage a projecting part of the arm to release the detent from the teeth of the wheel and to thereafter engage one of the teeth of said wheel to rotate the latter one step, said plunger being located in the path of the projection on the measuring-wheel to limit the reverse movement of the measuring-wheel, and a stop in the casing adapted to receive the thrust of the arm of said plunger when the projection on the measuring-wheel is brought into engagement with the plunger in the reverse movement of said measuring-wheel.

11. A rotary measuring device, comprising a casing, a toothed wheel journaled therein, a dial on the casing, a pointer connected with the toothed wheel and coöperating with the dial, a reciprocating plunger in said casing at one side of the toothed wheel provided at one end with a detent adapted to engage the teeth of said toothed wheel and at its other end with a laterally-directed arm, a rotary measuring-wheel journaled in the casing and projecting thereinto between the plunger and toothed wheel, and projecting parts on said measuring-wheel adapted to engage a projecting part of the arm to release the detent thereof from the teeth of the toothed wheel and to thereafter engage one of the teeth of said wheel to rotate the latter one step, and a spring bearing against said arm to hold the detent of the plunger normally engaged with the toothed wheel.

12. A rotary measuring device, comprising a casing, a toothed wheel journaled therein, a dial on the casing, a pointer connected with the toothed wheel and coöperating with the dial, a reciprocating plunger in said casing at one side of the toothed wheel provided at one end with a detent adapted to engage the teeth of said toothed wheel and at its other end with a laterally-directed arm, a rotary measuring-wheel journaled in the casing and projecting thereinto between the plunger and toothed wheel, and projecting parts on said measuring-wheel adapted to engage a projecting part of the arm to release the detent thereof from the teeth of the toothed wheel and to thereafter engage one of the teeth of said wheel to rotate the latter one step, a spring bearing against the arm to hold the detent of the plunger normally engaged with the toothed wheel, and means independent of the measuring-wheel for lifting said plunger against the action of said spring.

13. A rotary measuring device, comprising a casing, a toothed wheel journaled therein, a dial on the casing, a pointer connected with the wheel and coöperating with the dial, a reciprocating plunger in the casing provided with a detent adapted to interlock with the teeth of said toothed wheel, a rotary measuring-wheel journaled in the casing and projecting thereinto, between said toothed wheel and plunger, projecting parts on said measuring-wheel adapted to engage said plunger to release the detent from the toothed wheel and thereafter rotate said toothed wheel one step, and a spring-pressed lever pivoted in the casing and having at one end a finger-piece projecting through a slot in the casing-wall and adapted to engage at its other end a projection on said plunger to release the detent from the toothed wheel, said lever being provided with flat extensions which cover the slot in the casing through which said finger-piece passes.

14. The combination with a rotative toothed wheel, a spring-pressed plunger at the side thereof and parallel with the plane of the wheel, a detent on the plunger, adapted to interlock with the teeth of the wheel, an actuating-wheel having its periphery located between the toothed wheel and plunger and projections on the actuating-wheel adapted to engage said plunger and the teeth of the toothed wheel respectively, whereby the plunger will be first raised to free the detent of the toothed wheel and said toothed wheel thereafter rotated.

15. The combination with a rotative toothed wheel, a spring-pressed plunger at the side thereof and parallel with the plane of the wheel, a detent on the plunger adapted to interlock with the teeth of said wheel, an actuating-wheel having its periphery located between the toothed wheel and plunger, a laterally-directed arm on the plunger opposite the detent on said plunger and located at the margin of the tooth-wheel and projections on the actuating-wheel adapted to engage said arm to raise the plunger to release the detent from the toothed wheel, and thereafter rotate said wheel.

16. A measuring device comprising a frame or casing, a rotary graduated measuring-wheel journaled in the casing and projecting therefrom for contact with the article to be measured, a dial on the casing, a pointer coöperating with said dial and associated with mechanism having a step-by-step movement, means for locking said pointer from movement in either direction after each step of its movement and means on the measuring-wheel for first effecting the release of said locking means and thereafter positively engaging said pointer mechanism to move the pointer one step, said measuring-wheel being at other times operatively free from said pointer mechanism.

In testimony that I claim the foregoing as my invention I affix my signature, in presence of two witnesses, this 6th day of May, A. D. 1901.

JOHN F. STECKENREITER.

Witnesses:
WILLIAM L. HALL,
GERTRUDE BRYCE.